(12) United States Patent
Fetting, Jr. et al.

(10) Patent No.: US 7,344,010 B2
(45) Date of Patent: Mar. 18, 2008

(54) OVERRUNNING COUPLING ASSEMBLY INCLUDING CLUSTERED PAWLS AND METHOD FOR CONTROLLING THE ENGAGEMENT OF PLANAR MEMBERS

(75) Inventors: Robert D. Fetting, Jr., Caro, MI (US); Brice A. Pawley, Midland, MI (US)

(73) Assignee: Means Industries, Inc., Saginaw, MI (US)

( * ) Notice: Subject to any disclaimer, the term of this patent is extended or adjusted under 35 U.S.C. 154(b) by 268 days.

(21) Appl. No.: 11/226,789

(22) Filed: Sep. 14, 2005

(65) Prior Publication Data

US 2007/0056825 A1 Mar. 15, 2007

(51) Int. Cl.
*F16D 41/16* (2006.01)

(52) U.S. Cl. .................. 192/43.1; 192/46; 192/69.1

(58) Field of Classification Search ............... 192/43.1, 192/69.1
See application file for complete search history.

(56) References Cited

U.S. PATENT DOCUMENTS

| | | |
|---|---|---|
| 5,070,978 A | 12/1991 | Pires |
| 5,449,057 A | 9/1995 | Frank |
| 5,597,057 A | 1/1997 | Ruth et al. |
| 5,806,643 A | 9/1998 | Fitz |
| 5,871,071 A | 2/1999 | Sink |
| 5,918,715 A | 7/1999 | Ruth et al. |
| 5,927,455 A | 7/1999 | Baker et al. |
| 5,964,331 A | 10/1999 | Reed et al. |
| 5,979,627 A | 11/1999 | Ruth et al. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| 6,854,577 B2 | 2/2005 | Ruth |
| 2006/0278486 A1* | 12/2006 | Pawley et al. ............. 192/43.1 |

* cited by examiner

*Primary Examiner*—Richard M Lorence
(74) *Attorney, Agent, or Firm*—Brooks Kushman P.C.

(57) ABSTRACT

An overrunning coupling assembly and a method of controlling the engagement of planar first and second members are provided wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

22 Claims, 6 Drawing Sheets

OVERRUNNING COUPLING ASSEMBLY INCLUDING CLUSTERED PAWLS AND METHOD FOR CONTROLLING THE ENGAGEMENT OF PLANAR MEMBERS

BACKGROUND OF THE INVENTION

1. Field of the Invention

This invention relates to overrunning coupling assemblies and methods for controlling the engagement of planar members.

2. Background Art

Overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

A driving member is connected to one race, and a driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes inner and outer races wherein one race is connected to a driving member and the other race is connected to the driven member. Overrunning coupling sprags are disposed between the inner cylindrical surface of the outer race and the outer cylindrical surface of the inner race so that the sprags lock the races together as torque is delivered to the driven member. The sprags become unlocked with respect to the inner and outer race surfaces when torque transfer is interrupted.

U.S. Pat. No. 5,927,455 discloses a bidirectional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them. One plate is connected to the driving member and the other plate is connected to the driven member. Each plate has strut recesses. A series of struts is located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,116,394 discloses an overrunning coupling assembly including a notch plate and an annular coupling pocket plate positioned in face-to-face relationship with respect to each other along a common axis. The pocket plate includes strut pockets disposed at angularly spaced positions about the axis. The notch plate includes notch recesses at angularly spaced positions about the common axis and positioned in juxtaposed relationship with respect to the strut pockets. The notch plate includes an inner circumferential rail at a radially inward side of the notch recesses and an outer circumferential rail at a radially outward side of the notch recesses. Torque-transmitting struts are positioned in the strut pockets. Each strut has first and second ears at one edge thereof for enabling pivotal motion of the struts about an ear axis intersecting the ears. The opposite edge of each strut is engageable with one of the notch recesses whereby one-way torque transfer may occur between the plates. Each opposite edge has first and second corners. Each strut pocket is sufficiently enlarged to allow pivotal movement of each strut about a strut axis which is parallel with the common axis, thereby enabling one of the first and second corners to be selectively supported by one of the inner and outer circumferential rails to prevent the struts from slapping against the notch recesses as the notch plate and pocket plate are respectively counterrotated.

U.S. Pat. No. 5,964,331 discloses a one-way clutch comprising a pocket plate and a notch plate situated in a juxtaposed adjacent relationship. One-way clutches of this kind are sometimes referred to as planar clutches because the adjacent juxtaposed surfaces are situated in radial planes with respect to the axis of the clutch.

For purposes of this disclosure, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

A pocket plate may be provided with angularly disposed recesses or pockets about the axis of a one-way clutch. The pockets are formed in the planar surface of the pocket plate. Each pocket receives a torque transmitting strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,979,627; 6,065,576; 6,125,980; 6,129,190; 6,186,299; 6,193,038; 6,386,349; 6,481,551; 6,505,721; 6,571,926; and 6,854,577.

It is desirable to minimize the amount of material used to make such clutches. It is also desirable to simplify the process used to manufacture such clutches. It is further desirable to have an overrunning or free-wheeling capability in such clutches or assemblies, wherein overrun drag is reduced which, in turn, allows the controlling mechanism to be reduced in cost and complexity.

SUMMARY OF THE INVENTION

An object of the present invention is to provide an overrunning coupling assembly and method for controlling the engagement of planar members wherein the assembly includes clustered pawls held within their respective pawl-holding portions, which clustered pawls are controlled by a control element or slide plate to provide a controllable, one way clutch having reduced cost (slide plate and control mechanism), reduced complexity (improved assembly) and reduced overrun drag on the slide plate.

In carrying out the above object and other objects of the present invention, an overrunning coupling assembly is provided. The assembly includes a planar first member having an inside first surface. A planar second member has an inside second surface closely adjacent to the first surface. At least one of the members is mounted for rotation about a first axis. Pawl-receiving portions and pawl-holding portions are formed on the members. A forward set of free-floating pawls and a reverse set of free-floating, clustered pawls are received and retained in the pawl-holding portions but not physically secured to the pawl-holding portions. The pawls are movable between engaged and disengaged positions between the pawl-receiving and pawl-holding portions. The reverse pawls prevent rotation between the members in a reverse direction about the first axis in their engaged position and allow rotation between the members in a forward direction about the first axis in their disengaged position. A first set of biasing members are carried by the pawl-holding portions and urge the forward and reverse set of pawls outwardly from their respective pawl-holding portions. A control element is mounted for controlled, shifting movement between the surfaces relative to the pawl-holding portions and operable to control position of the reverse set of clustered pawls. The control element has at least one opening which extends completely therethrough to allow the reverse set of clustered pawls to extend therethrough to their engaged position in a first position of the control element and wherein the control element maintains the reverse set of clustered pawls in their disengaged position in a second position of the control element.

Relative rotation between the first member and the second member in the reverse direction about the first axis in the second position of the control element may cause the pawl-receiving portions to act against the forward set of pawls to move the forward set of pawls towards their disengaged position against the urging of their biasing members to permit free-wheeling.

The forward and reverse sets of pawls may be received and retained in same member.

The control element may have opposite ends.

The control element may be nested within the member having the pawl-holding portions formed thereon.

The control element may have tabs formed at the opposite ends.

The member which has the pawl-holding portions may include retaining pads for guiding shifting movement of the control element at the tabs.

An operating member may be operatively connected to the control element to selectively shift the control element between its first and second positions.

The control element may be a plate-like member.

The first and second members may be plate-like members.

Further in carrying out the above object and other objects of the present invention, an overrunning coupling assembly is provided. The assembly includes a planar first member having an inside first surface. A planar second member has an inside second surface closely adjacent to the first surface. At least one of the members is mounted for rotation about a first axis. Pawl-receiving portions and pawl-holding portions are formed on the members. A forward set of free-floating pawls and a reverse set of free-floating, clustered pawls are provided. The pawls are received and retained in the pawl-holding portions but not physically secured to the pawl-holding portions. The pawls are movable between engaged and disengaged positions between the pawl-receiving and pawl-holding portions. The reverse pawls prevent rotation between the members in a reverse direction about the first axis in their engaged position and allow rotation between the members in a forward direction about the first axis in their disengaged position. A control element is mounted for controlled rotation about the first axis relative to the pawl-holding portions between first and second angular positions between the surfaces and operable to control position of the reverse set of clustered pawls. The control element has at least one opening which extends completely therethrough to allow the reverse set of clustered pawls to extend therethrough to their engaged position in a first angular position of the control element. The control element maintains the reverse set of clustered pawls in their disengaged position in a second angular position of the control element.

Relative rotation between the first member and the second member in the reverse direction about the first axis in the second angular position of the control element may cause the pawl-receiving portions to act against the forward set of pawls to move the forward set of pawls towards their disengaged position to permit free-wheeling.

The forward and reverse sets of pawls may be received and retained in the same member.

The control element may have opposite ends.

The control element may be nested within the member having the pawl-holding portions formed thereon.

The control element may have tabs formed at the opposite ends.

The member having the pawl-holding portions may include retaining pads for guiding angular movement of the control element at the axial tabs.

An operating mechanism may be operatively connected to the control element to selectively shift the control element between its first and second angular positions.

The control element may be a plate-like member.

The first and second members may be plate-like members.

A method for controlling the engagement of first and second members is also provided. The first member has an inside first surface. The second member has an inside second surface closely adjacent the inside first surface. At least one of the members is mounted for rotation about a first axis. Pawl-receiving portions and pawl-holding portions are formed on the members. The method further includes providing a forward set of free-floating, pawls and a reverse set of free-floating, clustered pawls, the pawls being received and retained in the pawl-holding portions but not physically secured to the pawl-holding portions. Also included is the step of urging the forward and reverse sets of pawls outwardly from their respective pawl-holding portions. A single control element is provided between the first and second surfaces and is rotatable about the first axis relative to the pawl-holding portions. The control element has at least one opening which extends completely therethrough. The method also includes rotating the control element relative to the pawl-holding portions about the first axis. The at least one opening allows the reverse set of clustered pawls to extend therethrough in an engaged position and be received within the pawl-receiving portions in a first angular position of the control element to prevent rotation between the members in a reverse direction about the first axis. The control element maintains the reverse set of clustered pawls in a disengaged position in a second angular position of the control element in which rotation between the members is allowed in a forward direction about the first axis.

The control element may be guided during the step of rotating.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
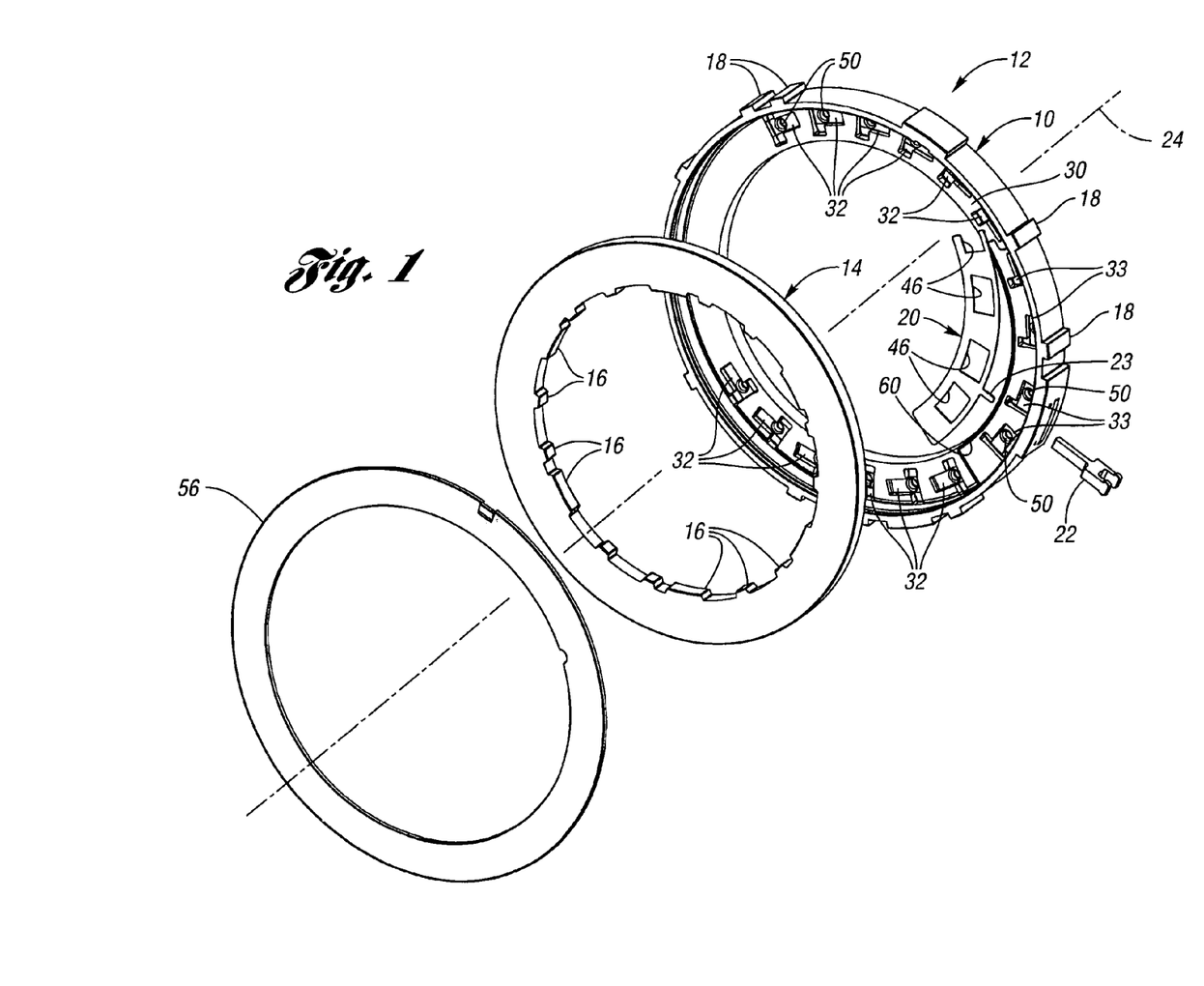
FIG. 1 is an exploded, perspective view of an overrunning coupling or clutch assembly (without corresponding pawls and springs for purposes of simplicity) constructed in accordance with one embodiment of the present invention.
Figures 2, 4:
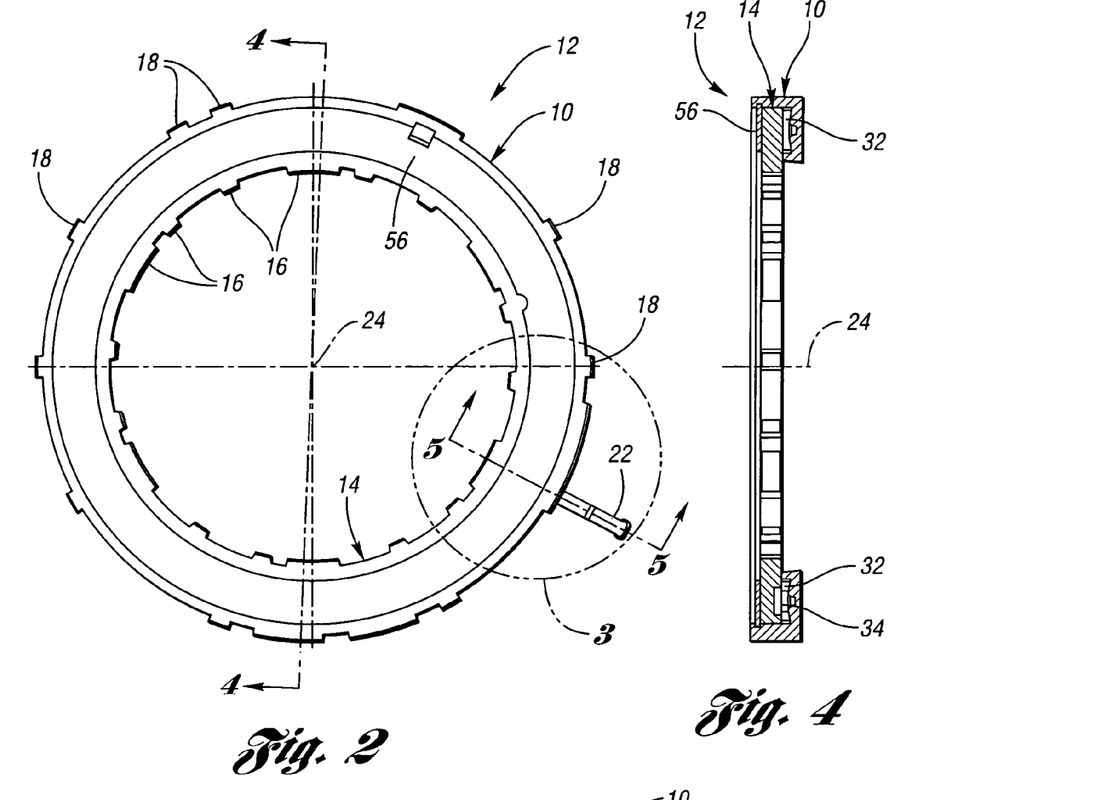
FIG. 2 is a top plan view of the assembly of FIG. 1.
FIG. 4 is a sectional view taken along lines 4-4 of FIG. 2.

FIG. 1 shows a pocket member or plate, generally indicated at 10, of a planar or overrunning coupling or clutch assembly, generally indicated at 12, constructed in accordance with one embodiment of the present invention. A coupling or notch plate, generally indicated at 14, is nested within the pocket plate 10, as shown in FIGS. 2 and 4. The notch plate 14 is to be connected to a part (not shown) via internal splines 16 formed on the notch plate 14, which engage splines on the part. The pocket plate 10 is provided with external splines 18.

An actuator (not shown) may be drivably connected to a slide or control element or plate, generally indicated at 20, via a slide plate fork 22, which is secured to a tab 23 of the control member or plate 20, thereby causing the control plate 20 to be adjusted angularly with respect to a first axis 24 as shown in FIG. 2 about which at least one of the plates 14 and 20 is rotatable. The control plate 20 is disposed between the plates 10 and 14 for limited angular rotation relative to the plates 10 and 14.

The control element or plate 20 is not a full circular part thereby requiring less material to manufacture the part. Hence, the parts can be nested closer together during a stamping assembly operation. Also, because the control plate 20 is not fully circular, it is easier to install into the clutch. For a full circle control plate with a control plate tab extending beyond the circular OD of the part, the only way to assemble it is to tilt the part on a difficult angle. Yet another advantage of using a less than fully circular control plate, such as the control plate 20, is to reduce surface area of the control plate 20. This results in reduced overrun drag which reduces the size of the controlling mechanism for the control plate 20.

Figure 3:
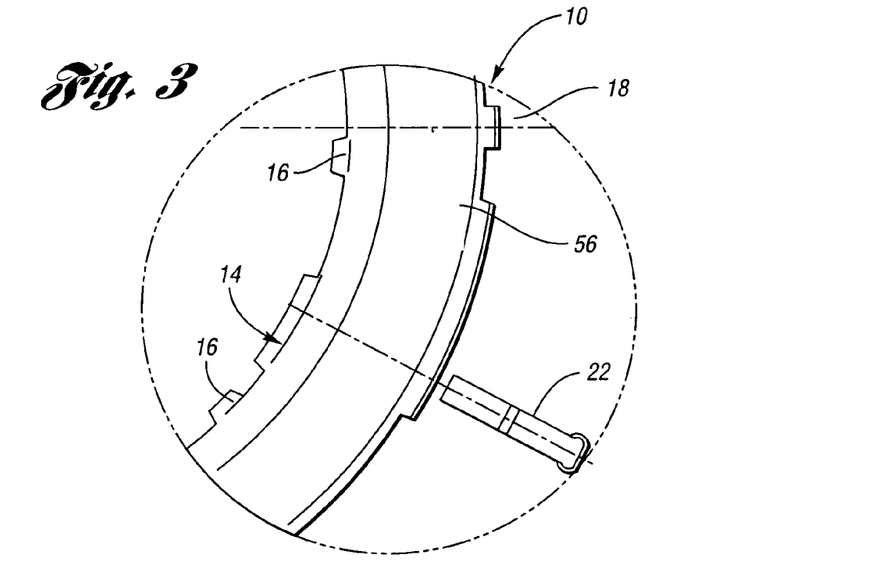
FIG. 3 is an enlarged, partially broken away view of a portion of the assembly of FIG. 2 with a control element in a reverse position.

The plate 14 can free-wheel in one angular direction about the axis 24 relative to the plate 10. The one-directional free-wheeling motion is achieved in an operating mode when the actuator adjusts the angular position of the control plate 20 relative to the pocket plate 10 (via the fork 22) about the axis 24 to a forward position which is obtained by moving the control plate 20 angularly upward a few degrees (such as 10°) from the reverse position, as indicated in FIG. 3.

Figure 6:
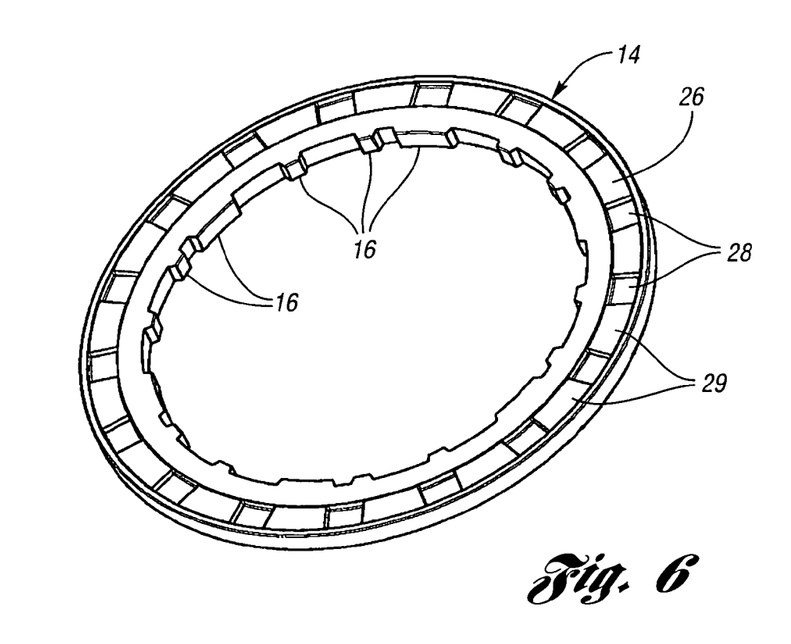
FIG. 6 is an isometric view of a notch plate of the assemblies of FIGS. 1 and 7.
Figure 7:
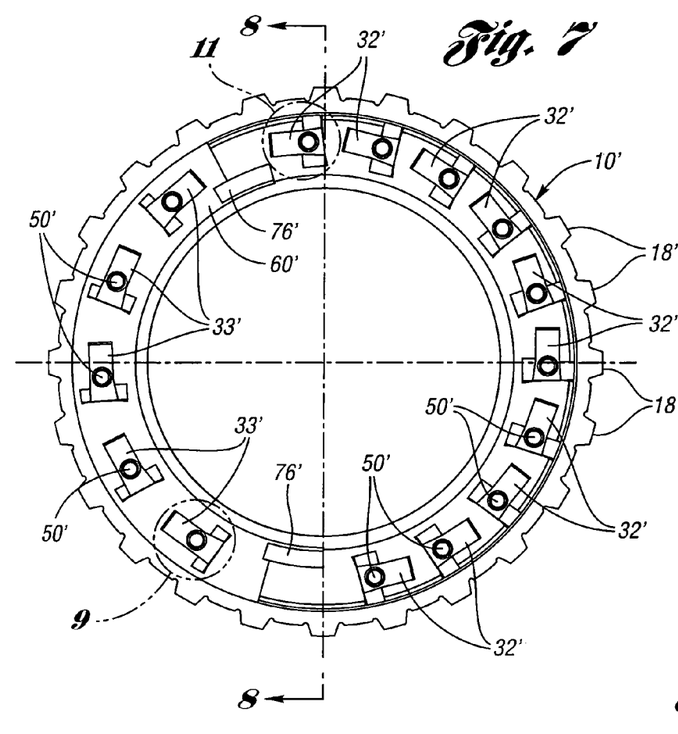
FIG. 7 is a schematic, top plan view illustrating a pocket plate of another embodiment of the assembly (without the corresponding struts and springs for purposes of simplicity)
Figure 8:
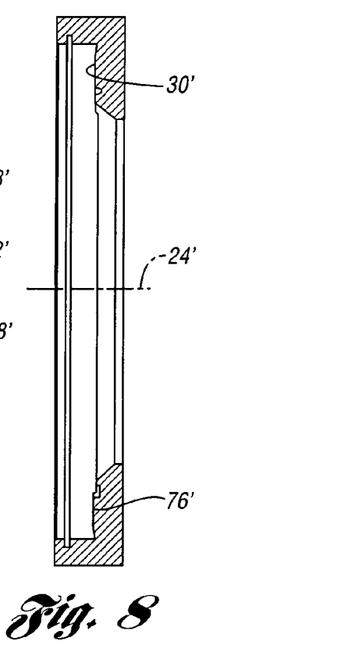
FIG. 8 is a sectional view taken along lines 8-8 of FIG. 7.

FIG. 1 illustrates the clutch or coupling assembly 12 in an exploded view. As indicated in FIG. 6, the notch plate 14 has an inside surface 26 with one or more notches 28 formed therein and separated by common walls 29. The notch plate 14 is adapted to be received in the pocket plate 10.

The pocket plate 10 has an inside surface 30 with forward recesses 32 and reverse recesses 33 formed in corresponding pawl-holding portions of the plate 10. Located intermediate the inside surfaces 26 and 30 of the plate 14 and the plate 10, respectively, is the control plate 20.

In the first embodiment, there are preferably sixteen struts or pawls 34 (FIG. 4) received and retained in the sixteen recesses 32 in pocket plate 10. Twelve of the pawls 34 are forward pawls for transferring torque in a forward direction about the axis 24 and four of the pawls 34 are reverse pawls substantially identical to the forward pawls clustered or grouped closely together in a curved row or line for preventing rotation between the members 10 and 14 in the "reverse" direction (i.e., see FIG. 3) about the axis 24. Each of the struts or pawls include a planar substantially rectangular portion and a pair of ears.

The preferred number of forward and reverse struts is based on required backlash and packaging space. Packaging space provides three limitations. The first limitation is the physical restriction of room for pawls or struts. The second limitation is based upon the first. The amount of room dictates the maximum number of struts but not necessarily the optimum number of discrete angles which designate the angular distance between pockets. In addition to this there are sometimes optimum positions between the forward and reverse strut clusters. Finally, the third limitation is based upon the amount of distance required between the clusters to insert the slide plate retaining pads, described in greater detail herein below.

When the control plate 20 is situated in the "forward" position it covers the "reverse" set of clustered pawls or struts. When the control plate 20 is situated in the "reverse" position it does not cover the "reverse" set of clustered struts. When uncovered, the "reverse" struts are allowed to prevent rotation between the pocket plate 10 and notch plate 14 in the "reverse" direction.

As shown in FIG. 1, the control plate 20 is provided with four clustered or grouped apertures 46. These are spaced and arranged angularly about the axis 24. When the control plate 20 is appropriately positioned in a "reverse" position (i.e., FIG. 3), one aperture 46 will be disposed directly over each recess 33.

The apertures 46 and the notches 28 are sized so that the portions of the reverse pawls can enter notches 28 of pawl-receiving portions of the notch plate 14 and engage edges of the notches 28 to establish a locking action between the reverse pawls and the plate 14 that will prevent rotation between the plate 14 and the plate 10.

If the control plate 20 is rotated to a different (i.e., forward) angular position from the reverse position, shown in FIG. 3, the reverse pawls rotate downwardly into their recesses 33 and will be at least partially covered by the control plate 20 and prevented from moving pivotally upward. When the control plate 20 is thus positioned, the plate 14 can free-wheel about the axis 24 with respect to the plate 10.

The forward pawls 34 are not covered by the control plate 20 but only by the notch plate 14. The forward pawls 34 may rotate outwardly while being partially held by the notch plate 14.

Figure 17:
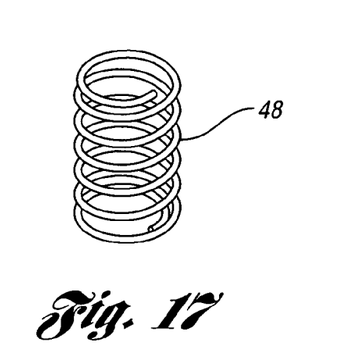
FIG. 17 is a perspective view of a coil spring for use with both the forward and reverse pawls or struts of FIGS. 4, 15, and 16.

Although any suitable strut spring can be used with one embodiment of the invention, FIG. 17 shows a preferred coil spring 48. One spring 48 is located under each of the forward and reverse pawls within recesses 50 formed in the recesses 32 and 33.

Figure 5:
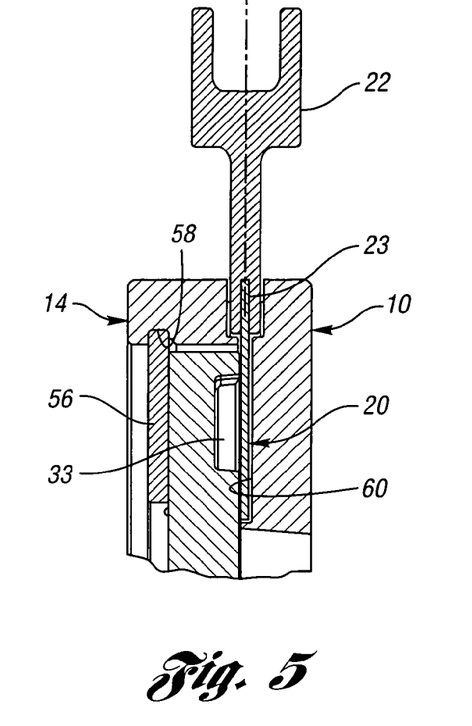
FIG. 5 is an enlarged, sectional, partially broken away view taken along lines 5-5 of FIG. 2.

When the notch plate 14 is received within or nested within the pocket plate 10 with the control plate 20 therebetween, the plates 10 and 14 are held axially fast by a retainer ring or snap-ring 56. The snap-ring 56 is received and retained in a groove 58 formed in the plate 10, the groove 58 being best seen in FIG. 5. When assembled, the control plate 20 is located within an annular groove 60 formed in the pocket plate 10.

Referring now to FIGS. 7-16, a second embodiment of the assembly is illustrated wherein parts with the same or similar structure or function have the same reference numeral but a single prime designation.

The control element 20' in this embodiment includes axial tabs 70'. The tabs 70' give the slide plate 20' the ability to accommodate more axial clearance of the controllable clutch assembly of the second embodiment. Also, the control plate tab 23' at one end of the control plate 20' allows the control tab slot in the plate 10' to be moved away from the axial loads carried in the pocket plate skirt. The control tab slot also exists in the pocket plate skirt. If the slot and axial loads interact, there is a high probability of premature fracture.

Figure 9:
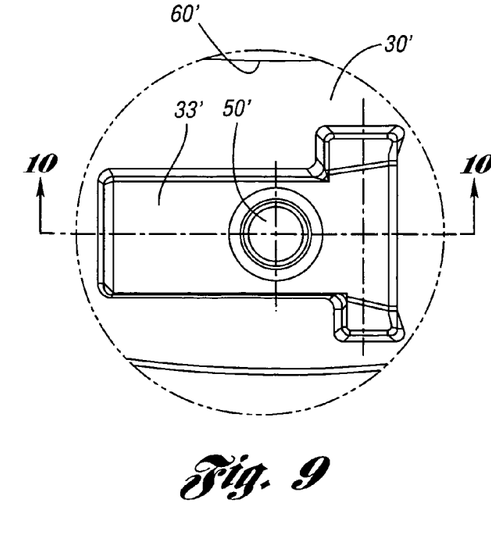
FIG. 9 is an enlarged view of a reverse pawl-holding portion shown in FIG. 7.
Figure 10:
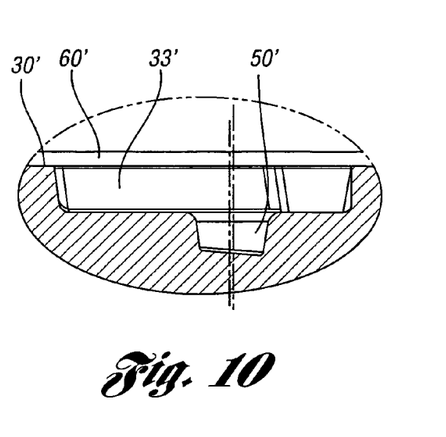
FIG. 10 is a view, partially broken away and in cross-section, taken along lines 10-10 of FIG. 9.
Figure 11:
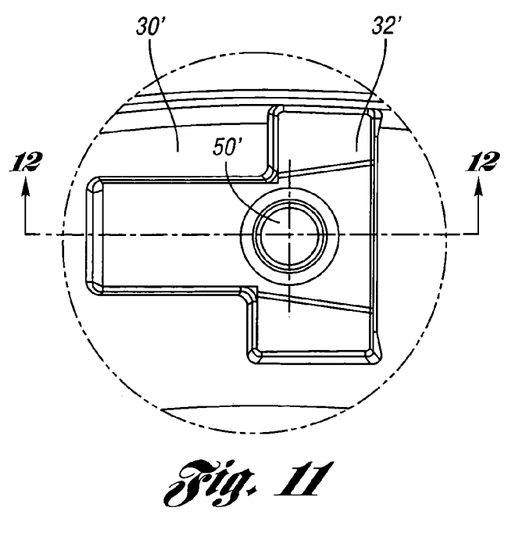
FIG. 11 is an enlarged view of a forward pawl-holding portion shown in FIG. 7.
Figure 12:
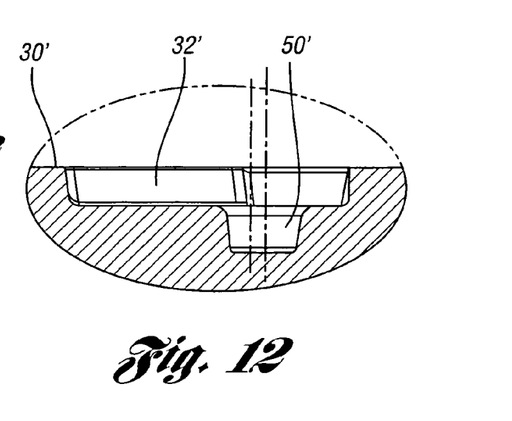
FIG. 12 is a view, partially broken away and in cross-section, taken along lines 12-12 of FIG. 11.
Figure 13:
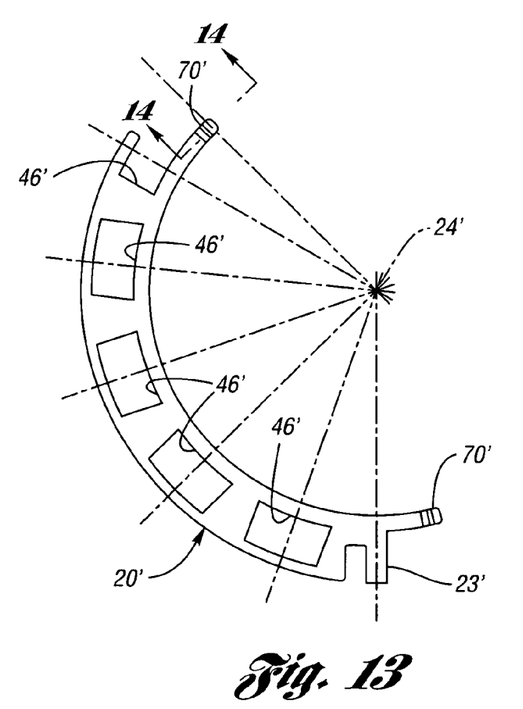
FIG. 13 is a top plan view of a control element for use with the pocket plate of the second embodiment.
Figure 14:
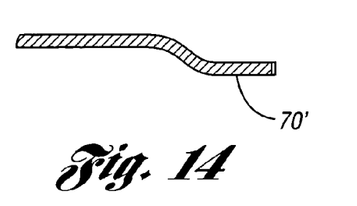
FIG. 14 is a view, partially broken away and in cross-section, taken along lines 14-14 of FIG. 13.
Figure 15:
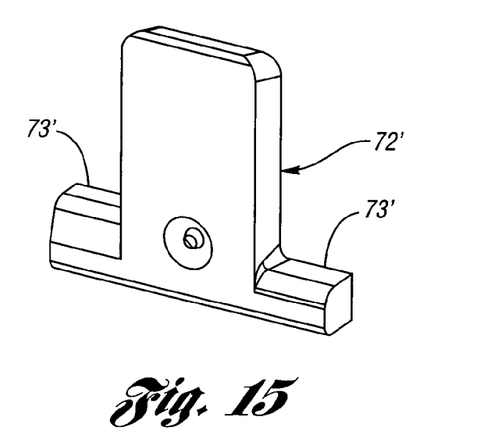
FIG. 15 is a perspective view of a forward pawl or strut for use in the second embodiment of the invention.
Figure 16:
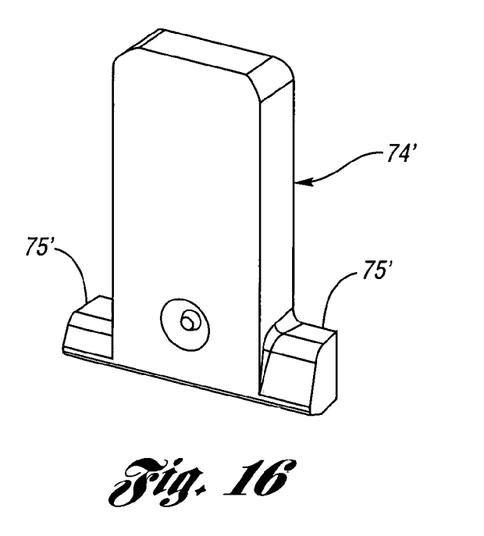
FIG. 16 is a perspective view of a reverse pawl or strut for use in the second embodiment.

In the embodiment of FIGS. 1-6, only one strut design is used for both reverse and forward clustered locations. In the embodiment of FIGS. 7-16, there is illustrated a reverse strut, generally indicated at 74' (i.e., FIG. 16), which can be disengaged with little or no relative movement between the two races of the notch and pocket plates. The end of the strut 74' is squared off to provide this feature. Since the reverse torque is higher, the reverse strut 74' is wider and thicker than a forward strut, generally indicated at 72' in FIG. 15. The ears 73' of the forward strut 72' are taller than ears 75' on the reverse strut 74'. Consequently, the reverse recesses 33' as shown in FIGS. 9 and 10 are different from the forward recesses 32' in FIGS. 11 and 12.

The reverse struts 74' rotate through more angle than the forward struts 72' do in order to engage the notch plate of the second embodiment. To keep the springs, such as the spring 42 of FIG. 17, the same for both forward and reverse struts 72' and 74', respectively, an angle is provided on the bottom of the pocket 50' formed in the reverse recesses 33' to significantly reduce side loads on the spring 48.

Retaining pads 76' inserted between the clusters create a recess for the additional local affective depth to the control plate 20' at its tabs 70' which extend into the recesses. They also serve as a guide for the control plate 20'. When the control plate tab 23' is moved, eccentric or side loads try to move the control plate 20' out of its intended position. The retaining pads 76' solve both issues.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overrunning coupling assembly comprising:
   a planar first member having an inside first surface;
   a planar second member having an inside second surface closely adjacent to the first surface, at least one of the members being mounted for rotation about a first axis;
   pawl-receiving portions and pawl-holding portions formed on the members;
   a forward set of free-floating pawls and a reverse set of free-floating, clustered pawls, the pawls being received and retained in the pawl-holding portions but not physically secured to the pawl-holding portions, the pawls being movable between engaged and disengaged positions between the pawl-receiving and pawl-holding portions, the reverse pawls preventing rotation between the members in a reverse direction about the first axis in their engaged position and allowing rotation between the members in a forward direction about the first axis in their disengaged position;
   a first set of biasing members carried by the pawl-holding portions and urging the forward and reverse set of pawls outwardly from their respective pawl-holding portions; and
   a control element mounted for controlled, shifting movement between the surfaces relative to the pawl-holding portions and operable to control position of the reverse set of clustered pawls, the control element having at least one opening which extends completely therethrough to allow the reverse set of clustered pawls to extend therethrough to their engaged position in a first position of the control element and wherein the control element maintains the reverse set of clustered pawls in their disengaged position in a second position of the control element wherein each of the forward and reverse sets of pawls is clustered or grouped closely together in a curved line or row and wherein the control element is less than fully circular.

2. The assembly as claimed in claim 1, wherein relative rotation between the first member and the second member in the reverse direction about the first axis in the second position of the control element causes the pawl-receiving portions to act against the forward set of pawls to move the forward set of pawls towards their disengaged position against the urging of their biasing members to permit free-wheeling.

3. The assembly as claimed in claim 1, wherein the forward and reverse sets of pawls are received and retained in same member.

4. The assembly as claimed in claim 1, wherein the control element has opposite ends.

5. The assembly as claimed in claim 4, wherein the control element is nested within the member having the pawl-holding portions formed thereon.

6. The assembly as claimed in claim 4, wherein the control element has tabs formed at the opposite ends.

7. The assembly as claimed in claim 6, wherein the member having the pawl-holding portions includes retaining pads for guiding shifting movement of the control element at the tabs.

8. The assembly as claimed in claim 1, further comprising an operating member operatively connected to the control element to selectively shift the control element between its first and second positions.

9. The assembly as claimed in claim 1, wherein the control element comprises a plate-like member.

10. The assembly as claimed in claim 1, the first and second members comprise plate-like members.

11. An overrunning coupling assembly comprising:
a planar first member having an inside first surface;
a planar second member having an inside second surface closely adjacent to the first surface, at least one of the members being mounted for rotation about a first axis;
pawl-receiving portions and pawl-holding portions formed on the members;
a forward set of free-floating pawls and a reverse set of free-floating, clustered pawls, the pawls being received and retained in the pawl-holding portions but not physically secured to the pawl-holding portions, the pawls being movable between engaged and disengaged positions between the pawl-receiving and pawl-holding portions, the reverse pawls preventing rotation between the members in a reverse direction about the first axis in their engaged position and allowing rotation between the members in a forward direction about the first axis in their disengaged position; and
a control element mounted for controlled rotation about the first axis relative to the pawl-holding portions between first and second angular positions between the surfaces and operable to control position of the reverse set of clustered pawls, the control element having at least one opening which extends completely therethrough to allow the reverse set of clustered pawls to extend therethrough to their engaged position in a first angular position of the control element and wherein the control element maintains the reverse set of clustered pawls in their disengaged position in a second angular position of the control element wherein each of the forward and reverse sets of pawls is clustered or grouped closely together in a curved line or row and wherein the control element is less than fully circular.

12. The assembly as claimed in claim 11, wherein relative rotation between the first member and the second member in the reverse direction about the first axis in the second angular position of the control element causes the pawl-receiving portions to act against the forward set of pawls to move the forward set of pawls towards their disengaged position to permit free-wheeling.

13. The assembly as claimed in claim 11, wherein the forward and reverse sets of pawls are received and retained in the same member.

14. The assembly as claimed in claim 11, wherein the control element has opposite ends.

15. The assembly as claimed in claim 14, wherein the control element is nested within the member having the pawl-holding portions formed thereon.

16. The assembly as claimed in claim 14, wherein the control element has tabs formed at the opposite ends.

17. The assembly as claimed in claim 16, wherein the member having the pawl-holding portions includes retaining pads for guiding angular movement of the control element at the axial tabs.

18. The assembly as claimed in claim 11, further comprising an operating mechanism operatively connected to the control element to selectively shift the control element between its first and second angular positions.

19. The assembly as claimed in claim 11, wherein the control element comprises a plate-like member.

20. The assembly as claimed in claim 11, wherein the first and second members comprise plate-like members.

21. A method of controlling the engagement of first and second members, the first member having an inside first surface, the second member having an inside second surface closely adjacent the inside first surface, at least one of the members being mounted for rotation about a first axis and pawl-receiving portions and pawl-holding portions formed on the members, the method comprising:
providing a forward set of free-floating, pawls and a reverse set of free-floating, clustered pawls, the pawls being received and retained in the pawl-holding portions but not physically secured to the pawl-holding portions;
urging the forward and reverse sets of pawls outwardly from their respective pawl-holding portions;
providing a single control element between the first and second surfaces and being rotatable about the first axis relative to the pawl-holding portions, the control element having at least one opening which extends completely therethrough; and
rotating the control element relative to the pawl-holding portions about the first axis, the at least one opening allowing the reverse set of clustered pawls to extend therethrough in an engaged position and be received within the pawl-receiving portions in a first angular position of the control element to prevent rotation between the members in a reverse direction about the first axis wherein the control element maintains the reverse set of clustered pawls in a disengaged position in a second angular position of the control element in which rotation between the members is allowed in a forward direction about the first axis wherein each of the forward and reverse sets of pawls is clustered or grouped closely together in a curved line or row and wherein the control element is less than fully circular.

22. The method as claimed in claim 21, further comprising guiding the control element during the step of rotating.

* * * * *